(12) United States Patent
Innings et al.

(10) Patent No.: US 9,795,150 B2
(45) Date of Patent: Oct. 24, 2017

(54) DEAERATOR SYSTEM AND METHOD FOR DEAERATION

(71) Applicant: Tetra Laval Holdings & Finance S.A., Pully (CH)

(72) Inventors: Fredrik Innings, Torna Hällestad (SE); Tomas Skoglund, Lund (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 15/059,531

(22) Filed: Mar. 3, 2016

(65) Prior Publication Data

US 2016/0183549 A1    Jun. 30, 2016

Related U.S. Application Data

(62) Division of application No. 14/344,466, filed as application No. PCT/EP2012/067774 on Sep. 12, 2012.

(30) Foreign Application Priority Data

Sep. 16, 2011   (SE) ...................... 1150844
Sep. 16, 2011   (SE) ...................... 1150845

(51) Int. Cl.
  *B01D 19/00*    (2006.01)
  *A23C 1/12*    (2006.01)
  *A01J 11/04*    (2006.01)

(52) U.S. Cl.
  CPC ................. *A23C 1/12* (2013.01); *A01J 11/04* (2013.01); *B01D 19/0036* (2013.01); *B01D 19/0063* (2013.01)

(58) Field of Classification Search
  CPC ...... A23C 1/12; B01D 19/00; B01D 19/0063; B01D 19/0036; A01J 11/04
  USPC .................................................. 95/241–266
  See application file for complete search history.

(56) References Cited

U.S. PATENT DOCUMENTS 4,816,044 A     3/1989   Weisert et al.
2006/0120858 A1  6/2006   Taylor

FOREIGN PATENT DOCUMENTS

DE     10 2007 049475        4/2009
DE     102007049475 A1 *     4/2009   ......... B01D 19/0036
GB     1 078 674              8/1967
(Continued)

OTHER PUBLICATIONS

International Search Report issued by the EPO in corresponding International Application No. PCT/EP2012/067774, dated Aug. 2, 2013 (3 pages).

*Primary Examiner* — T. Bennett McKenzie
(74) *Attorney, Agent, or Firm* — Finnegan, Henderson, Farabow, Garrett & Dunner, LLP

(57) ABSTRACT

In a method for deaerating a liquid the liquid is pressurized to a pressure above atmospheric, after which it is guided to an upstream end of a nucleation valve. A low pressure resides on the downstream end of the nucleation valve and as the liquid passes the valve, bubble nucleation is initiated, forming the first step in a deaeration process. According to the method the temperature and pressure on the downstream side of the valve is controlled such that the static pressure is above the saturation pressure, while the lowest pressure as the liquid passes the valve is below or equal to the saturation pressure.

7 Claims, 2 Drawing Sheets

(56) References Cited

FOREIGN PATENT DOCUMENTS

GB     2 196 757     5/1988
SU      1321993     7/1987

* cited by examiner

DEAERATOR SYSTEM AND METHOD FOR DEAERATION

CROSS-REFERENCE TO RELATED APPLICATIONS

This is a division of application Ser. No. 14/344,466, filed Apr. 3, 2014, which is a U.S. National Phase Application of International Application No. PCT/EP2012/067774, filed Sep. 12, 2012, which claims the benefit of priority to Swedish Patent Application No. 1150845-4, filed Sep. 16, 2011, and Swedish Paten Application No. 1150844-7, filed Sep. 16, 2011. The disclosures of the above-referenced applications are expressly incorporated herein by reference to their entireties.

TECHNICAL FIELD

The present invention relates to a system and a method for deaeration of a liquid food product.

BACKGROUND

Within the field of packaging of liquid products deaeration is a well established concept and deaeration is included as an essential step in most processing plants e.g. in plants where liquid product is received as a bulk in a first end of the line and delivered as individual packaging containers in the other end of the line. Air (or oxygen) may be present in the liquid product for different reasons, the two main reasons being that it is dispersed or dissolved. Taking the example of milk, there will be some oxygen in the milk already before it has left the cow, and more oxygen will be mixed and dissolve into the milk at each processing step starting with the milking process itself.

The air and oxygen may result in several negative effects ranging from reduced skimming efficiency in separators, cavitation in the product during processing, fouling of heating surfaces in pasteurizers, shortened product shelf life (due to oxidation), etc., which are some reasons to why deaeration is a well-established processing step.

To simplify the underlying theory, which obviously is well-established and well-known to the skilled person, the solubility of a gas such as oxygen or nitrogen in a liquid will depend of temperature and pressure. At lower temperatures more oxygen or nitrogen may be dissolved in the liquid than what is the case at a higher temperature, i.e. the saturation concentration is higher at a lower temperature. For pressure the relationship is reversed, the higher the pressure the higher the saturation concentration. This simple relationship establishes that in order to deaerate a liquid one or both of the temperature or the pressure may be altered. Also, it may be obvious that deaeration as such is not difficult to accomplish by simply dialing in the desired temperature and pressure of a particular saturation concentration in a vessel containing the liquid. In a commercial production line, however, the deaeration should allow treatment of thousands of liters of liquid product per hour with a requirement of being energy efficient which renders the theoretical approach of awaiting equilibrium to be reached inapplicable. Still, there are deaeration techniques used which are quite similar to the theoretical approach.

A deaeration method more commonly used in the main field of the present invention is to make use of a vacuum deaeration in an expansion vessel connected to vacuum. The liquid is transported to the expansion vessel with a certain temperature which is some degrees above the boiling point at the pressure prevailing in the expansion vessel. When the liquid enters the vessel via a valve and the temperature and pressure conditions in the vessel causes it to instantly start boiling, a process referred to as flash boiling (flash or flashing in the following). The process results in that liquid in vaporized and that air is released from dissolved form during flashing. Liquid vapor condense against cooled areas in the vessel, while the released air is evacuated from the vessel by the vacuum pump, while the liquid exits through an opening in the bottom of the vessel. In order to increase the separation rate the liquid may enter the expansion vessel in a tangential direction, so as to induce a swirl. This deaeration method is very efficient, yet in times of increasing energy costs as well as increased energy awareness there may still be room for improvements.

SUMMARY

For obvious reasons there are similarities between the present invention and the prior art in terms of the result to be achieved. However, a fundamental difference is that while the background art focuses on affecting the conditions at some location after the valve, most commonly the pressure and temperature in the expansion vessel, the present invention focuses on affecting how the fluid transitions from the conditions upstream the valve to the conditions downstream the valve, and on processing of the liquid prior to it reaching the separation vessel. Some parameters to adjust are the pressure upstream the valve and the pressure downstream the valve. In this way the pressure drop over the valve may be controlled. The dimensions of the restriction in the valve will in turn affect the flow velocity through the valve and thus the transition time. Subjecting the fluid to an instantaneous and significant pressure drop will induce nucleation. Experiments reveal that the nucleation of (gas) bubbles occurs in the entire volume of the fluid, i.e. a homogenous nucleation, and that it therefore facilitates an efficient deaeration. For one or more embodiments of the present invention it is preferred that even if the equilibrium pressure and temperature downstream the valve are such that the fluid does not flash, the minimum pressure caused by the restriction still will induce cavitation of the fluid, which also will facilitates deaeration.

To this end the present invention relates to a method for deaerating a liquid, comprising the steps of pressurizing the liquid to a pressure above atmospheric, guiding the pressurized liquid to an upstream end of a nucleation valve, and lowering the pressure on a downstream side of the valve to a subatmospheric pressure, thereby causing gas bubble nucleation as liquid passes the nucleation valve as the first step of the deaeration. Relying on the gas bubble nucleation as a first step in the deaeration process differs from prior art technique where flashing is the predominant effect utilized and the inventive method provides an energy efficient and time efficient deaeration method.

In one or more embodiments the method comprises the step of forming a free fluid jet with the nucleation valve. Experimental results indicate that the formation of a high-velocity jet flow, which in most applications will be a turbulent jet flow, will enhance the deaeration. The free jet flow is preferably not restricted (e.g. directed into a wall). In this context it should be noted that the flow is contained in some sort of piping or similar, and that some part of the formed jet will interact to some degree with the walls of the piping. The core of the jet will however not interact to any significant degree with a constructional delimitation of the system.

The method may also comprise the step of inducing a pressure drop over the valve, the pressure drop preferably exceeding 2 bar, more preferably exceeding 3 bar, suggestively being around 4 bar or 5 bar. Experiments indicate that an increased pressure drop results in an increased deaeration efficiency. It is indeed possible to apply higher pressures upstream the valve (in order to increase the pressure drop) yet there are practical constraints, e.g. in terms of pump capacity.

According to one or more embodiments thereof the method comprises the step of controlling the pressure downstream the valve such that it remains above or at the saturation pressure of the liquid. This will eliminate the risk of flash boiling on a larger scale.

In one or more embodiments the method comprises the step of guiding the liquid leaving the nucleation valve downstream into a diffusion reactor. In the diffusion reactor, into which the free jet is directed, dissolved gas in the liquid will diffuse from the liquid into the gas bubbles.

In order to separate the gas from the liquid further the present inventive method, in one embodiment thereof, may comprise the step of guiding the liquid leaving the diffusion reactor downstream into a separation vessel. This is preferably performed by having the diffusion reactor debouching directly into the separation vessel, in which gas phase is separated from liquid phase.

It is believed that the sudden pressure drop as such may be an important feature, yet it also seem beneficial to, in one or more embodiments of the present invention, control the pressure on the downstream side of the valve such that it is lower than 0.1 bar. In more general terms it may be stipulated that the pressure immediately after the valve should remain below 160%, such as below 150%, of the saturation pressure for the liquid at the particular temperature.

In one or more embodiments the pressure on the downstream side of the valve is controlled such that the static pressure is above the saturation pressure, while the lowest pressure as the liquid passes the valve is below the saturation pressure. As the liquid passes the valve it will be accelerated to a high-velocity flow, resulting in local pressure reduction due to the dynamic pressure. If the ambient static pressure is close to (above or at) the saturation pressure, the dynamic pressure may cause a drop below the saturation pressure. This will cause local flash boiling, which is believed to facilitate deaeration further.

According to another aspect of the present invention it relates to a system for deaerating a liquid according to the inventive method and embodiments thereof. An inventive system for deaerating a liquid, comprises a pump for increasing the pressure in the liquid on an upstream end of a nucleation valve, a vacuum pump for reducing the pressure on a downstream end of the pressure reducing valve and a control system for controlling the pumps.

According to one or more embodiments the nucleation valve provides an unrestricted flow after the pressure drop, such that a free fluid jet may be formed. Some valves have an intricate construction where the flow must follow an intricate channel after the main pressure reduction in the valve. Experiments indicate that such valves are less suitable for use in the present invention, and that the valve preferably should be off a non-complex design, at least following the main pressure drop, such that a free jet flow of liquid may extend from it during operation.

The control system may be adapted to induce a pressure drop over the valve preferably exceeding 2 bar, more preferably exceeding 3 bar, suggestively being around 4 bar or 5 bar. In one or more embodiments the control system is adapted to control the temperature and pressure downstream the valve such that the liquid is kept below or at its boiling point.

An inventive system, according to one or more embodiments thereof may also comprise a diffusion reactor arranged downstream the nucleation valve and in some embodiments also a separation vessel arranged downstream the diffusion reactor.

In embodiments where a diffusion reactor is used it is preferred that it has an elongate shape, and that it is rectilinear to minimize interference with the jet and the flow thereafter. The diffusion reactor may in one or more embodiments have a length exceeding about 100 cm, preferably exceeding 150 cm and more preferably a length of about 200 cm, and the width may in these or other embodiments be about 4-10 cm, preferably about 5 cm, for a circular cross section. The measures are exemplifying only, and mainly relevant for a flow in the order of 1-10,000 l/h. For higher flows, which are common within the field of the present invention the size of the diffusion reactor should preferably be scaled up. It is then a general preference to increase the cross section rather than the length of the diffusion reactor, and the cross section dimensions will scale linearly to the flow, such that a doubled flow leads to a doubled cross section.

In one or more embodiments at least 50% of the mass transfer from dissolved phase to gaseous phase occurs in the diffusion reactor, and in several embodiments significantly more than that. This measure will rely on the dimensions of the diffusion reactor, yet to a high degree it will depend on the operation parameters (pressure, temperature, flow rate) too. Even if the parameters may be quite complex, a simple measurement may be used to verify that the criterion is fulfilled. The feature as such is significantly different from most commercial systems where the transfer takes place in the expansion vessel.

According to another aspect of the present invention there is provided a diffusion reactor as defined above and below, which may preferably be used in the previously described inventive method and mounted downstream the described nucleation valve, or may be added as an additional component between a pressure reduction valve and the separation vessel of a conventional system. The purpose of the diffusion reactor is to allow for the gas molecules (i.e. dissolved gas) to further diffuse from the liquid to the now existing and growing nuclei/gas bubbles. A method of deaeration including the step of guiding a liquid through such diffusion reactor downstream a nucleation valve is also anticipated. The present invention according to one or more embodiments thereof may provide a deaerator system with increased energy efficiency

DESCRIPTION OF EMBODIMENTS

Figure 1:
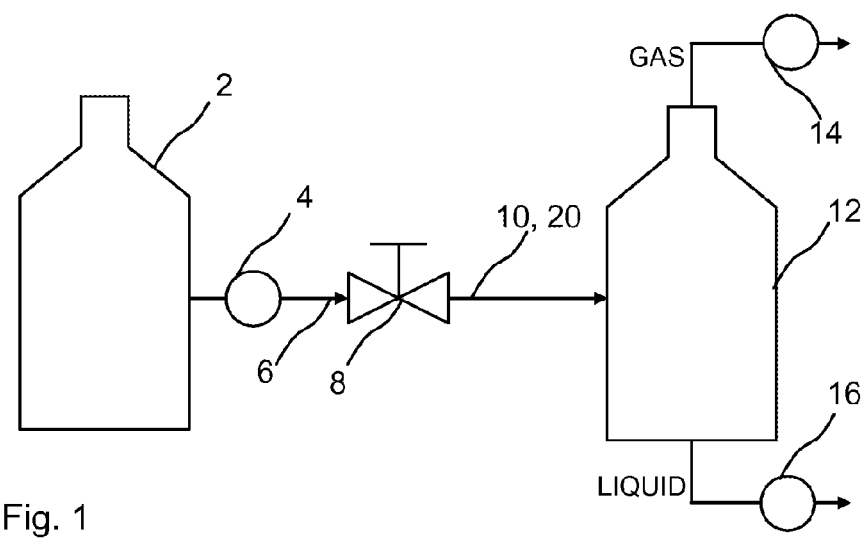
FIG. 1 is a schematic view of a deaerator system according to a first embodiment of the present invention.

Some portions of a system for processing a liquid will be described referring to FIG. 1. The present invention may form part of such a system, though individual components may be replaced without departing from the scope of the invention as defined by the claims.

Starting at an upstream position, the system comprises a tank 2 or other system for holding or delivering the liquid to be processed. The system also comprises a pump 4 for increasing the pressure in the liquid, subjecting it to an elevated static pressure $P_{UPSTREAM}$ such that it is forced downstream. The pump 4 may in one or more embodiments be a centrifugal pump, yet other alternatives may be feasible. Piping 6 guides the liquid to the first processing step, namely to the nucleation valve 8. Before describing details of the valve, some words about the arrangement downstream the valve should be mentioned. The piping 10 guiding the liquid following the nucleation valve 8 debouches in a separation vessel 12. In the present embodiment the separation vessel 12 comprises an expansion vessel, connected to a vacuum pump 14 in an upper end, and connected to an evacuation system 16 for liquid in a lower end. Air and other gases resulting from the deaeration will be evacuated via the upper end, while deaerated liquid will be pumped out via the lower end of the vessel. To avoid evacuation of vaporized liquid the upper end of the vessel may comprise a condenser, condensing the vaporized liquid such that it may leave via the lower end instead. The vacuum pump 14 generates a lowered static pressure pressure $P_{DOWNSTREAM}$ propagating to the downstream end of the nucleation valve 8.

Returning to the nucleation valve 8, the increased static pressure upstream the valve will push the liquid towards the nucleation valve 8 and the lowered static pressure downstream the valve will pull the liquid, the relevant term to consider being the pressure drop over the valve 8, which may be defined as $\Delta P = P_{UPSTREAM} - P_{DOWNSTREAM}$.

In the present embodiment $P_{DOWNSTREAM}$ preferably corresponds to a pressure above the vapor pressure at the residing temperature and for the fluid being processed, such to avoid flashing, partly since the generation of flash is energy consuming. To this end it should be mentioned that as the liquid passes the constriction of the valve it will accelerate to a significant velocity, which may cause the dynamic pressure to momentarily drop below the vapor pressure.

Figure 2:
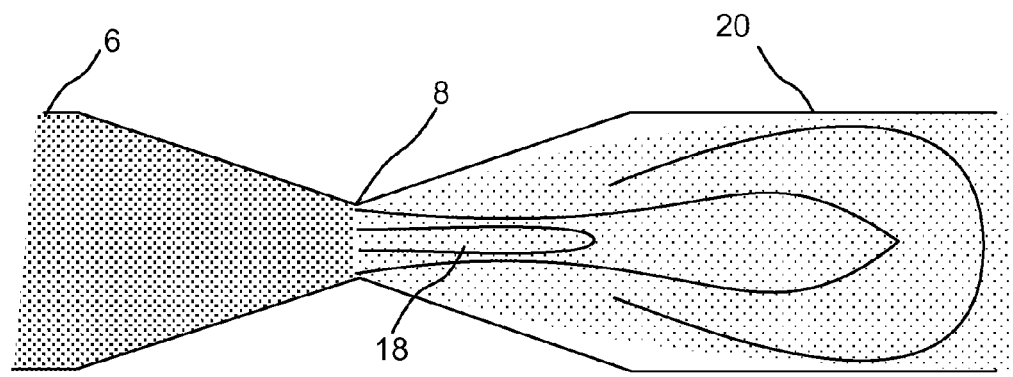
FIG. 2 is a detail view of a portion of the deaerator system according to the first embodiment.

The rapid pressure drop "shocks" the liquid such that a homogenous nucleation occurs, which is beneficial for deaeration. It has been confirmed in experiments that the momentary flash or cavitation in the valve 8 is beneficial from a deaeration perspective. Immediately after being homogenously nucleated the liquid enters the low pressure region downstream the valve in the form of a jet 18, which rapidly breaks up such that the liquid exposes a large surface area forming the interface between gas and liquid. Conditions beneficial for deaeration thus prevail downstream the valve. This is schematically illustrated in FIG. 2

The valve layout, e.g. in terms of exact shape of its nozzle orifice(s) is not crucial, yet some parameters seem to be important, and two are worth mentioning in particular: 1) The pressure drop should occur rapidly, basically instantly as the liquid passes the valve 8. This indicates that the valve construction should be non-complex, without any intricate tubing following or preceding the nozzle orifice. 2) After the pressure drop the resulting jet should be non-constraint, i.e. a free jet should be allowed to form and break up. This also indicates that a non-complex valve construction without intricate tubing following the orifice is advantageous. In one embodiment the valve may be of a type having a conical regulating plug with a lip seal. This is a standard type of valve and examples include the SPC-2 valve (Alfa Laval), which is a sanitary electro-pneumatic regulating valve for use in stainless steel pipe systems. A simple hour-glass shaped restriction will also due, at least during constant operating conditions, yet a controllable valve is preferred.

For the above reasons, a diffusion reactor 20 is arranged downstream the valve 8, as part of the piping 10. The diffusion reactor 20 will enable turbulent diffusion of the dissolved gas in the liquid phase to the now existing and growing nuclei/gas bubbles, and it should have a construction not entailing a large pressure drop. In the embodiment of FIG. 2 the diffusion reactor 20 comprises a rectilinear pipe, having a diameter such that it does not interact with the formation of the previously mentioned jet 18. Sooner or later as the jet 18 breaks up the flow will diverge and interact with the walls of the diffusion reactor, and even a non-breaking jet would sooner or later impact on the lower wall due to gravity. The flow will continue towards the separation vessel, pulled by the vacuum, where it will be separated into a liquid flow and a gas flow. At some point the jet will fill the whole diameter of the diffusion reactor 20, the exact location depending on pressure, temperature, flow velocity, etc.

In the present embodiment the diffusion reactor 20 is arranged in a horizontal direction. In a second embodiment the diffusion reactor may be arranged in a vertical direction, with the jet coming from above. With this arrangement the pressure loss generated by the diffusion reactor will be compensated by the effect of gravity, reducing the losses in the system. The diffusion reactor may be mounted in any inclination between vertical and horizontal without departing from the scope of the present invention, as defined by the claims.

In the text below some operating parameters for embodiments of the present invention are listed, which may facilitate enablement for a skilled person. The amount (or rate) of liquid being processed may be in the order of up to about 100,000 l/h, though smaller flows are possible, and in experiments conducted flows in the order of 6,000 l/h have been used. These rates are common within the field of the invention, and details in regard of pumps and such on the downstream side of the valve 8 will not be discussed in detail.

The pressure drop over the valve $\Delta P$ preferably exceeds 2 bar, and it is even more preferred that it exceeds 3 bar, and it may be as high as 4 bar or 5 bar. There is no technical problem in increasing $\Delta P$ even further yet the pump used to elevate the pressure will be increasingly expensive.

The temperature downstream the valve should preferably be lower than the flash temperature (the boiling point at the prevailing pressure $P_{DOWNSTREAM}$), such as $-10°$ C. below flash or $-5°$ C. or between those temperatures and the flash temperature. Temperatures closer to flash have been found to increase the deaeration efficiency. Flash boiling will still have a beneficial impact on the deaeration, yet experiments verify that it is not as dramatic as for prior art systems.

The length of the diffusion reactor may be about 100-200 cm, yet it may be even longer. A longer diffusion reactor will improve the deaeration efficiency, yet it may also increase pump losses, which is an unwanted feature. The diameter of the diffusion reactor may be about 5 cm (2" pipe) and it may be manufactured from stainless steel. In theory the diameter of the diffusion reactor would benefit from being larger, since it would result in lower pressure loss, yet due to parameters related to working at pressures close to vacuum may result in a tradeoff where the suggested diameter is beneficial. Smaller diameters may result in reduced deaeration efficiency, supposedly due to a shorter hold up time and an increased interaction between the jet (or spray) and the walls of the diffusion reactor, and due to increased pressure losses, e.g. making the pressure drop less abrupt.

There is no abrupt pressure drop as the liquid passes from the diffusion reactor 20 into the separation vessel 12, in which the separation process initiated in the nucleation valve 8 is finalized. The separation vessel 12 may therefore be of quite rudimentary design as compared to prior art systems where flashing takes place in the expansion vessel. Further, since flash boiling is avoided to a large extent, the amount of vapor is reduced, resulting in that less energy has to be spent on condensing the vapor.

All components of the system being in contact with the product should be made from food grade material or approved for use when processing foodstuff.

The pressure in the liquid upstream the nucleation valve, as well as the flow through the nucleation valve may be controlled by the nucleation valve 8 and the pump 4, i.e. a frequency regulated pump, and for these purposes the pump 4 may also comprise a control valve (not shown).

If the temperature of the liquid upstream the nucleation valve 8 is controlled, this may be effected by means of a heat exchanger.

The pressure downstream the nucleation valve 8 is controlled by pressure regulation of the separation vessel 12.

The temperature of the liquid downstream the nucleation valve 8 is normally not controlled in situations where no flash boiling occurs. The pressure in the separation vessel 12 may be used to control the temperature, if so desired.

Figure 3:
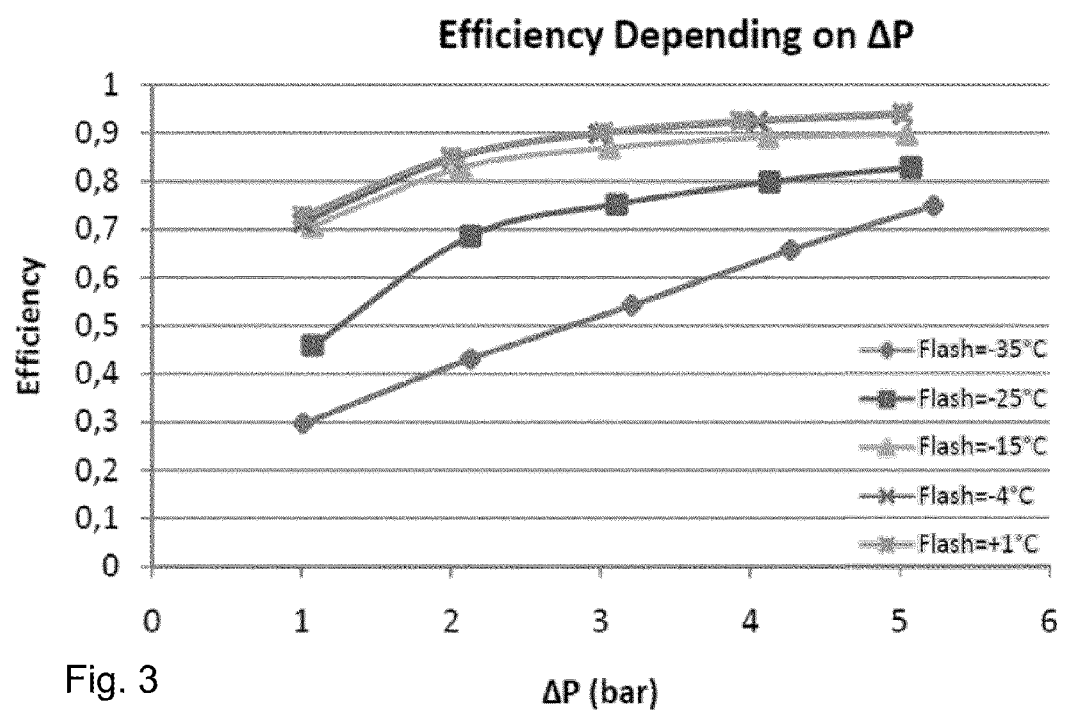
FIG. 3 is a graph illustrating the oxygen removal efficiency as a function of the pressure drop for various temperatures relative to the flash boiling temperature.

In order to substantiate and validate the present invention according to several embodiments thereof extensive experimental studies were conducted. In those experiments the flow of the liquid ranged from 3,000 to 9,000 l/h, the relative flash temperature from −35 to +1° C. (negative indicating a temperature below flash boiling), and ranged between 1 and 5 bar. For each of the numerous measurement points several aspects, such as oxygen concentration as a function of the position after the nucleation valve, the void fraction as a function of the position after the nucleation valve, pressure as a function of the position after the nucleation valve, the overall deaeration efficiency, the cavitation index, etc was measured, estimated or calculated. FIG. 3 is a graph showing the oxygen removal efficiency as a function of ΔP for some different temperatures (again the temperatures are given relative to the flash temperature). The graph indicates that for a system according to at least one embodiment of the present invention the oxygen removal efficiency does not vary significantly between a temperature slightly below the flash boiling temperature and a temperature slightly above the same.

The invention claimed is:

1. A method for deaerating a liquid, comprising:
pressurizing the liquid to a static pressure above atmospheric,
guiding the pressurized liquid through a nucleation valve, and
lowering the static pressure on a downstream end of the valve to a subatmospheric static pressure, thereby causing bubble nucleation as the liquid passes the nucleation valve,
wherein the temperature and pressure on the downstream end of the valve is controlled such that the static pressure is above the saturation pressure of the liquid, and such that the lowest dynamic pressure, as the liquid passes the valve, is below or equal to the saturation pressure of the liquid.

2. The method of claim 1, wherein the static pressure drop across the valve ranges between 2 bar and 5 bar.

3. The method of claim 1, further comprising controlling the static pressure immediately downstream of the valve, such that it remains below 150% of the saturation pressure for the liquid at that temperature.

4. The method of claim 1, further comprising guiding the liquid leaving the nucleation valve downstream directly into a diffusion reactor, in which dissolved gas in the liquid will diffuse from the liquid into the gas bubbles.

5. The method of claim 1, further comprising forming a free fluid jet after the nucleation valve.

6. The method of claim 4, further comprising guiding the liquid leaving the diffusion reactor downstream into a separation vessel.

7. The method of claim 4, wherein at least 50% of a mass transfer from dissolved phase to gaseous phase occurs in the diffusion reactor.

* * * * *